US007124177B2

(12) United States Patent
Watanabe

(10) Patent No.: US 7,124,177 B2
(45) Date of Patent: Oct. 17, 2006

(54) NETWORK DEVICE MANAGEMENT METHOD, SYSTEM AND MANAGEMENT EQUIPMENT THEREOF

(75) Inventor: Hirotake Watanabe, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 663 days.

(21) Appl. No.: 09/824,005

(22) Filed: Apr. 3, 2001

(65) Prior Publication Data
US 2002/0062364 A1    May 23, 2002

(30) Foreign Application Priority Data
Nov. 17, 2000    (JP)    ............................. 2000-350408

(51) Int. Cl.
*G06F 15/173*    (2006.01)
(52) U.S. Cl. ...................... 709/223; 709/220; 709/228; 710/8; 710/15; 713/1
(58) Field of Classification Search ................ 709/220, 709/221, 222, 223, 228; 710/8–15; 713/1, 713/100
See application file for complete search history.

(56) References Cited

U.S. PATENT DOCUMENTS

| | | | | | |
|---|---|---|---|---|---|
| 5,758,041 | A | * | 5/1998 | Shimura | 358/1.14 |
| 6,076,110 | A | * | 6/2000 | Murphy et al. | 709/228 |
| 6,332,159 | B1 | * | 12/2001 | Hatae et al. | 709/224 |
| 6,425,007 | B1 | * | 7/2002 | Messinger | 709/224 |
| 6,442,144 | B1 | * | 8/2002 | Hansen et al. | 370/255 |
| 6,516,347 | B1 | * | 2/2003 | Nakamura | 709/221 |
| 6,658,586 | B1 | * | 12/2003 | Levi | 714/4 |
| 2004/0250072 | A1 | * | 12/2004 | Ylonen | 713/170 |

FOREIGN PATENT DOCUMENTS

| | | |
|---|---|---|
| JP | 3-1736 | 1/1991 |
| JP | 09-233071 | 9/1997 |
| JP | 09-251434 | 9/1997 |
| JP | 9-330284 | 12/1997 |
| JP | 10-4407 | 1/1998 |
| JP | 10-164345 | 6/1998 |
| JP | 11-234335 | 8/1999 |
| JP | 11-252154 | 9/1999 |
| JP | 2000-132365 | 5/2000 |
| JP | 2001-333068 | 11/2001 |

OTHER PUBLICATIONS

Japanese Office Action 2000-350408 dated Apr. 25, 2006.

* cited by examiner

*Primary Examiner*—Kim Huynh
*Assistant Examiner*—Eron J. Sorrell
(74) *Attorney, Agent, or Firm*—Westerman, Hattori, Daniels & Adrian, LLP.

(57) ABSTRACT

Disclosed is a method for managing a plurality of network devices by management equipment connected to a network, so that an operator can easily distinguish each network device managed by the management equipment at the installation location of the network device. Management equipment (1) performs functions of; automatically assigning and managing the identification information for each plurality of network devices (6-1 to 6-N); visually outputting the identification information assigned by the administrator; and indicating the identification information of network devices (6-1 to 6-N) on a management screen of the management equipment (1) using an identifier which is the same as the identification information. Thus the same identifier is commonly used for both the identifier indicated on the management screen and the identifier displayed on the network device. Thus, at the installation location, the operator can easily recognize the network device indicated on the management screen.

9 Claims, 12 Drawing Sheets

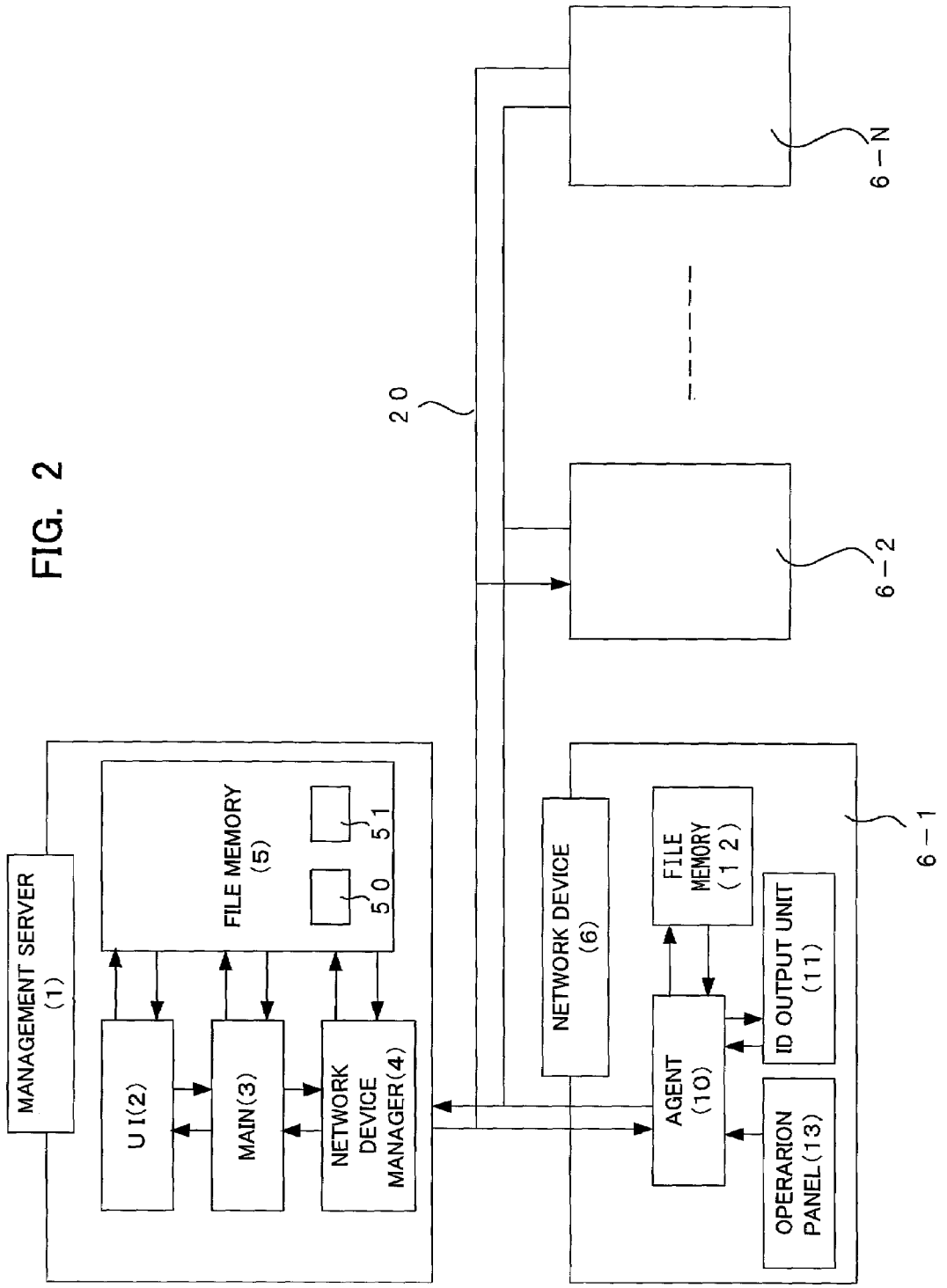

| IP ADDRESS | MAC ADDRESS | KIND OF DEVICE | DEVICE NAME | PRIMARY IDENTIFICATION (COLOR) | SECONDARY IDENTIFICATION (NAME) |
|---|---|---|---|---|---|
| 86.21.35.51 | 00000C5B1234 | PRINTER | VSP4750 | RED | Pr-1 |
| 86.21.35.52 | 00000C5B1245 | PRINTER | VSP4750 | BLUE | Pr-2 |
| 86.21.35.54 | 00000C5B2358 | PRINTER | VS10S | YELLOW | Pr-3 |
| 86.21.35.12 | 00000C5B1254 | SCANNER | VSP320 | RED | Sc-1 |
| 86.21.35.86 | 00000C5B3155 | SCANNER | VSP320 | BLUE | Sc-2 |
| 86.21.35.86 | 00000C5B3155 | SCANNER | VSP320 | BLUE | Sc-2 |
| 86.21.35.87 | EMPTY | | | | |
| 86.21.35.88 | EMPTY | | | | |
| 86.21.35.89 | EMPTY | | | | |

| ID | PRIMARY IDENTIFICATION (COLOR) | SECONDARY IDENTIFICATION (NAME) | MAC ADDRESS | DEVICE NAME |
|---|---|---|---|---|
| 5 | YELLOW GREEN | Pr-5 | | |
| 6 | GREEN | Pr-6 | | |
| 7 | LIGHT BLUE | Pr-7 | | |
| 8 | BLUE | Pr-8 | | |
| 9 | BROWN | Pr-9 | | |
| 10 | GRAY | Pr-10 | | |
| 1 | RED | Pr-1 | 00000C5B1234 | VSP4750 |
| 2 | PURPLE | Pr-2 | 00000C5B1234 | VSP4750 |
| 3 | ORANGE | Pr-3 | 00000C5B1234 | VS10S |
| 4 | YELLOW | Pr-4 | | |

OPE-PANE MODE

ID OUTPUT MODE(WAITING MODE)

EVENT OCCUR

NETWORK DEVICE MANAGEMENT METHOD, SYSTEM AND MANAGEMENT EQUIPMENT THEREOF

FIELD OF THE INVENTION

The present invention relates to a network device management method for managing the status of a plurality of network devices using a server, a system using the method and management equipment therefor, more particularly a network device management method for visually recognizing each network device managed at the installation location using a display screen of a server, a system using the method and management equipment therefor.

DESCRIPTION OF THE RELATED ART

In recent years, networks such as local area networks and wide area networks have been introduced all over the place. This results in rapid increase of network devices constituting network systems. The network system generally provides a network server and software therefor for administrating network devices. The network devices include printers, scanners, computers and other peripheral equipment. The network server is for use in setting conditions of the network devices and maintaining these devices operational. Today systems of such configuration have been increasing.

As an example, in a system disclosed in the official gazette of the Japanese Unexamined Patent Publication No. 2000-132365, a plurality of printers implemented in a user's premise, typically enterprise site, are managed by a management software in a server. A management software displays on a screen information related to the plurality of printers being installed on a floor of the premise. Also, in a premise consisting of a plurality of floors, a large number of printers are managed to integrate. The management software displays on the screen information related to printers by accessing data maintained in each printer. Here, the data maintained are classified into three categories;

Data included at the time of shipment from a factory (classified device name, MAC address, device serial No., etc.)

Data set by an administrator (printer location information, etc.)

Data indicating the printer conditions (paper empty, paper jam, hardware error, or printer setting request, etc.)

As an object of management software, such function as obtaining the printer status is provided. A storekeeper utilizes software in a server for managing warehouse of supplies. The storekeeper request for a list onto the screen for the whole printers installed on the premise, to check whether the printer is in 'paper near empty' condition, then to let new papers be delivered to the printer location when necessary.

In addition, the management software aims at maintaining the printers, for example, to install a firmware of a revised version to a printer having frequent troubles caused by the use of an old version.

However, a problem arises in operation. There may often be used peripheral devices, typically printers, of the same model connected to the identical network. Devices of the same model have the same appearances. Therefore it is difficult to distinguish which of the installed devices actually corresponds to the device displayed on the screen requesting intervention by the management software.

Each device has its own information such as an equipment serial number, MAC address, IP address, etc., which are uniquely assigned to each. These values however are merely strings of numerals or symbols which are not particularly meaningful for user. In addition, the equipment serial number is printed mostly with small letters somewhere on the device, which is very inconvenient for the operator in charge to identify.

In a management software conventionally used, there is applied a method that the management software assigns a proper name corresponding to each device. However, this method normally requires naming and inputting actions by the operator, which is rather troublesome, and it is probable case that the operator does not always input. Or, the name being actually input is only known by the operator who determined the name. If the name is not visually indicated onto each network device, the operator may well forget the name assigned before.

More specifically, the problem is as described below.

For example, a storekeeper sees information displayed on the screen by the management software to find 'paper near end' condition occurred on a certain printer out of more than ten sets of printers. On the floor where the printers are disposed, nearly ten sets of printers of the same model are placed. Thus if the storekeeper goes to the place where the printers are installed, it is difficult for the storekeeper to distinguish the printer having 'paper near end' condition.

The management software indicates an MAC address from the start of operation after installation. The MAC address has 12 digits consisting of hexadecimal figures, which is very difficult for the user to remember. In addition, it is required for the user to display that number by operating the printer.

In order to manage efficiently, an administrator often assigns each printer an independent name. Supposing there is installed ten printers, inputting ten independent names is required, which is a time-consuming task. On each printer side, there is no means to indicate the assigned name. The user must take such measures as sticking a seal indicating the assigned name onto each printer.

In either case, troublesome work is required for the user.

SUMMARY OF THE INVENTION

Accordingly, it is an object of the present invention to provide a method for managing network devices enabling the user to specify each network device recognized by a network management side easily at the installation location, as well as to provide a system using the above-mentioned method and management equipment therefor.

It is another object of the present invention to provide a method for managing a network device, enabling to establish a link between a network management software and an identifier so that the user can distinguish each device at the installation location of the network device, a system using the method and management equipment therefor.

It is still another object of the present invention to provide a method for managing a network device enabling automatic generation of an identifier so that the user can distinguish each device at the installation location of the network device, a system using the method and management equipment therefor.

To attain the above objects, the method for managing a plurality of network devices comprises the steps of; assigning identification information to each network device to set thereto using management equipment; outputting the identification information visually at the installation location of the network device; and indicating the network device with an identifier which is the same as the above-mentioned identification information on a network device management screen of the management equipment.

According to an aspect of the present invention, a network management system having a plurality of network devices connected to management equipment through the network includes: the management equipment for assigning identification information to each network device to set thereto; and a plurality of network devices for visually outputting the identification information, in which the management equipment indicates the network device with an identifier which is the same as the identification information onto a network device management screen.

According to another aspect of the present invention, network device management equipment for managing a plurality of network devices through the network includes: a management unit for assigning identification information to each network device to set thereto; a user interface unit for indicating the network device information onto a network device management screen using the identifier which is the same as the identification information.

According to the present invention, automatic allocation and management of the identification information for each network device is carried out by management equipment. Each network device is provided with a visual output function of the assigned identification information of the network device concerned for indicating the identification information onto a management screen of the management equipment, using the identifier which is the same as the identification information. Accordingly, the identifier which is the same as the identifier indicated on a management screen is indicated on the network device, enabling the user to specify the actual network device having been indicated on the management screen easily at the installation location. Moreover, assigning the identifier in management equipment enables the user to assign identification information different from the identification information assigned before the factory shipment or used in the network. Thus an identifier easy to understand can be assigned. Further, because automatic allocation of the identifier and setting onto the network device is carried out by the management equipment, the identifier which is the same as that indicated on the management screen can be indicated at the location of the network device.

According to the present invention, preferably the setting step includes a step of retrieving a database having the identification information for network devices to assign automatically thereto. This enables easy automatic allocation of the identification information using the information appropriately defined by the user, and produces an effective identification function of the network device.

Further, according to the present invention, preferably the aforementioned outputting step includes a step of indicating the status of the network device onto an operation panel thereupon. This enables to utilize an existent unit of the network device to realize the network device identification function of the network management system.

Further scopes and features of the present invention will become more apparent by the following description of the embodiments with the accompanied drawings.

BRIEF DESCRIPTION OF THE DRAWINGS

FIG. 2 shows a schematic block diagram of the system shown in FIG. 1.

FIG. 3 shows a network device management table shown in FIG. 2.

FIG. 4 shows an identifier management table shown in FIG. 2.

DETAILED DESCRIPTION OF THE PREFERRED EMBODIMENTS

The preferred embodiments of the present invention are described hereinafter, in order of network device management system, network device management processing and another embodiment of the invention, referring to the charts and drawings.

[Network Device Management System]

Figure 1:
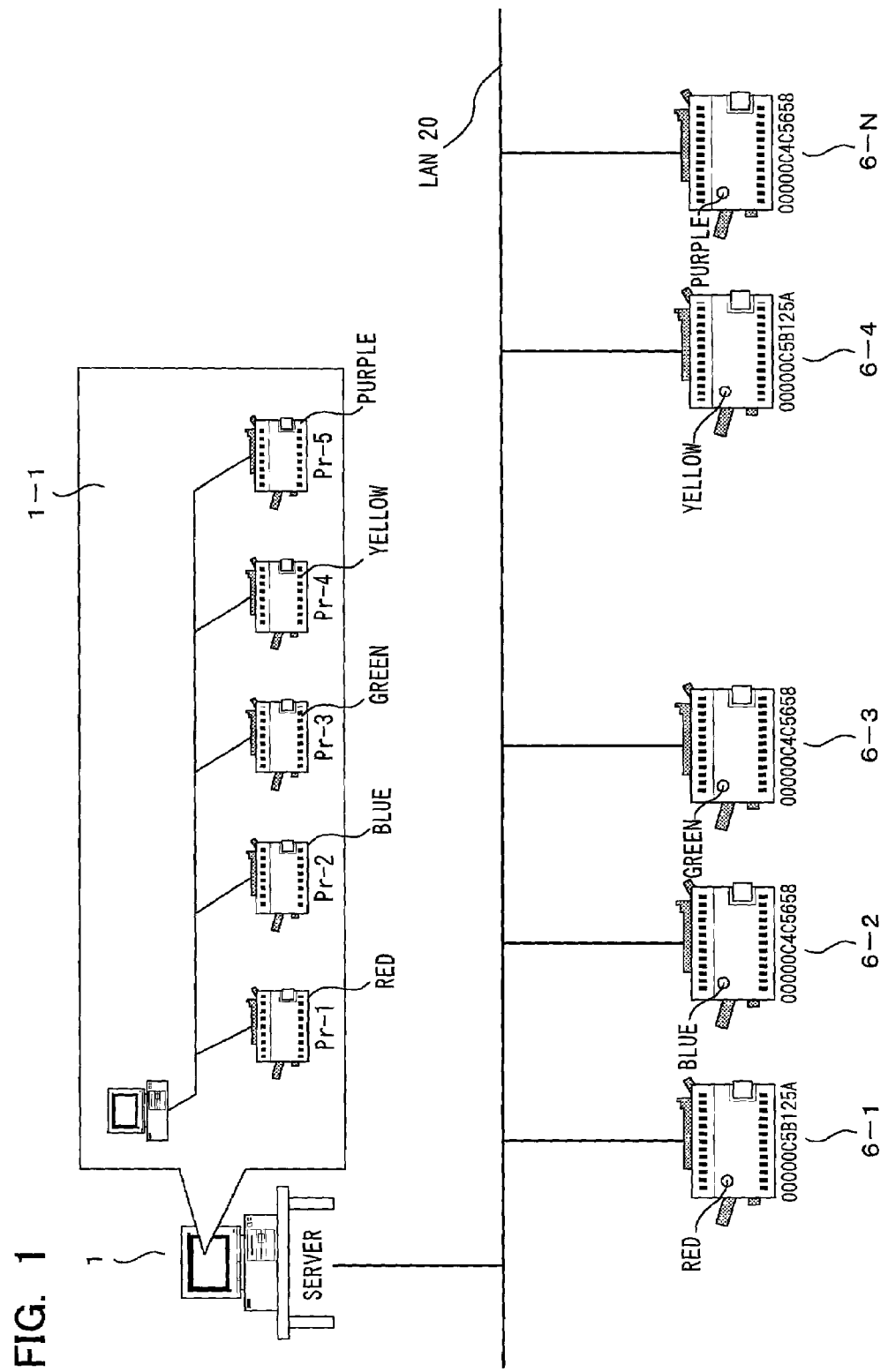
FIG. 1 shows a system configuration diagram according to an embodiment of the present invention.
Figure 5:
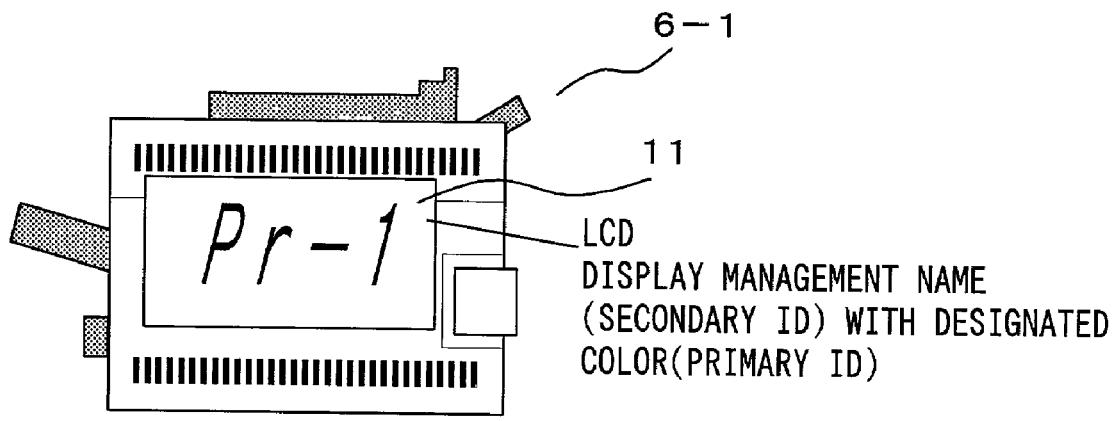
FIG. 5 shows an explanatory diagram of an identifier output unit at the network device.
Figure 6:
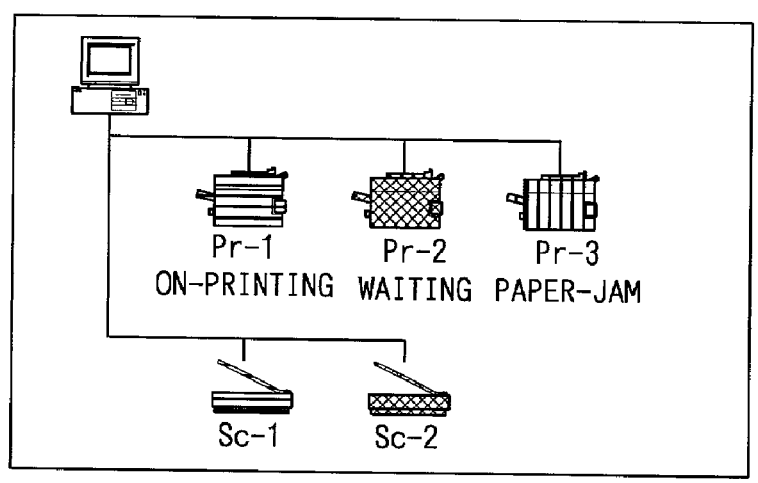
FIG. 6 shows an explanatory diagram of a management screen provided in the network management equipment shown in FIG. 1.

In FIG. 1, there is shown a system configuration diagram according to an embodiment of the present invention. Also, FIG. 2 is a schematic block diagram of the system shown in FIG. 1, FIGS. 3 and 4 are management tables shown in FIG. 2 and FIG. 5 is an explanatory diagram of an identification output unit in the network device, and FIG. 6 shows an explanatory diagram of an indication example of a management screen on the network management equipment.

As shown in FIG. 1, a plurality of network devices 6-1, 6-2, 6-3, 6-4 and 6-N are connected to a network 20 consisting of a local area network (LAN) or the like. It is assumed in this example that these network devices are printers. A management server (network management equipment) 1 is connected to network 20 for managing the network devices 6-1 through 6-N. In the example, management server 1 is assumed to be a printer management server. Further, other non-illustrated network devices such as personal computers, scanners and other peripheral devices are also connected to network 20. Each network device connected to network 20 is indicated on a server screen 1—1 in the form of icon.

As shown in a block diagram in FIG. 2, each network device 6-1 to 6-N is provided with an agent 10 for communicating with management server 1, an identifier output unit 11 for indicating an assigned indicator, memory 12 and an operation portion 13, as explained below. When a network device is a printer, there are also provided a printer controller and a printer engine which are not shown.

In management server 1, there are provided: a main processor 3 for determining the server operation as a whole; a network device manager 4 for managing network devices by communicating with agent 10 in a network device; a file memory 5; and a user interface unit 2 (hereinafter referred to as UI portion 2) for performing such functions as indicating network device information on a screen 1—1 shown in FIG. 1, preparing for manual setting, and investigating status of each network device. UI portion 2 generally provides a keyboard and a display monitor.

In file memory 5, a network device management table 50 (refer to FIG. 3) and an identifier management table 51 (refer to FIG. 4) are provided. As shown in FIG. 3, network device management table 50 stores the IP address, MAC address, device category and identifier of each network device. In this example, an identifier consists of two parts, which are referred to as a primary identifier and a secondary identifier. The primary identifier denotes a color while the secondary identifier denotes a device name.

Now, as shown in FIG. 4, identifier management table 51 is used for retrieving an identifier which has been registered but currently not used, to assign to a network device. Identifier management table 51 consists of the identification number, identifier (primary and secondary identifier), MAC address and device category. Identifiers that are easy to understand are prepared in advance either by a manufacturer of the software or the device, or by a user.

In this example, colors are used for the primary identifier on a per device category basis. Colors are uniquely prepared to avoid overlapping. To achieve this, the table is prepared on a per device category basis. Then, the device name ('Pr-1') is used for the secondary identifier by combining device category and an identification number of the first identifier. To assign an identifier to each network device, an identifier management table 51 in file memory 5 is provided.

More detailed explanation is given later in an explanation of network device management processing. A flow for use in adding a new network device 6-1 into management server 1 is explained hereafter.

When network device 6-1 in its initial state is connected to network 20, agent 10 in network device 6-1 broadcasts the initial information of network device 6-1 such as the MAC address to network 20. Network device manager 4 in printer management server 1 receives the broadcast information to search network device management table 50 in file memory 5.

When the MAC address is not found in table 50 of file memory 5, and the device is determined to be a newly installed device, an idle IP address is searched from IP addresses maintained by server 1 to assign to the newly installed device. The above method utilizes a known technique called the DHCP (dynamic host configuration protocol).

Next, an idle identifier is searched from identifier management table 51 in file memory 5 of management server 1, to assign to network device 6-1. In this example, mutually different colors within each device category are prepared as the primary identifier. Secondary identifier is generated using the combination of the identification number of this primary identifier with the device category.

When determining an identifier to assign, identifier management table 51 in file memory 5 is searched to select an identifier which is not used recently (by storing the used identifier into the bottom of the list). Through this operation, repeated use of the recently used identifier is avoided when addition and deletion of devices are repeatedly carried out.

Then, the assigned IP and identifier are forwarded to agent 10 of network device 6-1. Agent 10 stores the IP and the identifier into a memory 12 provided in each device. Identifier output unit 11 calls data stored in memory 12 to output identification information (in this case a color and a device name) constantly. In FIG. 5, identifier output unit 11 of network device 6-1 is shown. The unit 11 is configured with an indicator (for example, a liquid crystal indicator) provided on the side of network printer 6-1. The assigned device name (Pr-1) is displayed on identifier output unit 11 with the assigned color.

Now, on UI portion 2 of management server 1, the operating conditions of the network devices are displayed on the screen. As shown in FIG. 6, on the screen of management server 1, icons and conditions of respective network devices are indicated. The icon indicates an identifier linked with the displayed contents on identifier output unit 11 related to the device in concern. In this example, a printer icon is displayed with the identifier (color and device name) of the printer concerned.

Thus, it is easy to distinguish, at the installation location of the network device, which of the actual printers at the installation location corresponds to the printer indicated at management server 1. In case that the management software (or network device manager) 4 in the management server 1 is used for administrating the printers, an IP is assigned by the management software using DHCP function when a printer is newly installed in the identical sub-LAN 20. At this time, management software stores the MAC address of the newly installed printer into a list 50. Management software then extracts, from database 51 belonging thereto, an identification information currently not used for other printers to assign to the newly added MAC address. Here, in case printers of different model are being managed, it may also be possible to provide the database on a per device model basis, which results in assigning possibly duplicated identification information between the printers of different model.

The printer having been assigned the identification information maintains this information inside the printer, enabling to forward outside or transmit through the network when necessary. It may also be possible the identification information which was once automatically assigned be modified by the user (or operator).

Any information in the following may be used for identification.

(1) Identification information consisting of the name arbitrarily denoted by both the alphabetical and numeric letters, or numeric letters only, which may be indicated on the operation panel of the network device and is easy to introduce. The operation panel, however, is quite difficult to read unless looked from near the panel, and also may not be impressive to any person. To make it more efficient, another indicator having a large liquid crystal panel or a light emitting diode (LED) array is attached to the side face of the printer, so that the contents can be seen substantially far from the location of indication.

(2) Identification information with an assigned color proper to each printer. As shown in FIG. 1, the color indication is desired to have the combination of the three colors produced by LEDs, or to use the basic colors of the operation panel to assign. When a printer list is displayed for indicating the printers under management by the management software, it becomes easy for the operator to identify if the list and the icons are painted using the assigned color.

However, because there is a limited number of colors available for particular devices, duplication of colors is inevitable when the number of printers increases. Also, it is recommended not to use colors which are usually used for warning purposes (such as yellow, red or the like).

(3) Using an image for identification information. This method enables to expand the way of expression. An operation panel having high resolution is used for display. Easy recognition may be obtained by this method, as the image may be used for the icon in the management software. However, the more complicated the image becomes, the more data capacity is required as well as the less impression is presented. Therefore a simple image such as the mark of playing cards is desirable.

In actual operation, using the combination of the above-mentioned identification information, more effective result may be obtained. Among the above methods, usage of colors is recommendable from the viewpoint of strengthening impression, while using the written names in alphabet is more suitable in view of accurate recognition.

As shown in FIG. 6, needless to say, the method explained above is applicable to network devices including not only printers but other peripheral devices such as scanners.

[Network Device Management Processing]

Now, referring to FIGS. 7 through 10, a network device management processing is explained hereafter.

Figure 7:
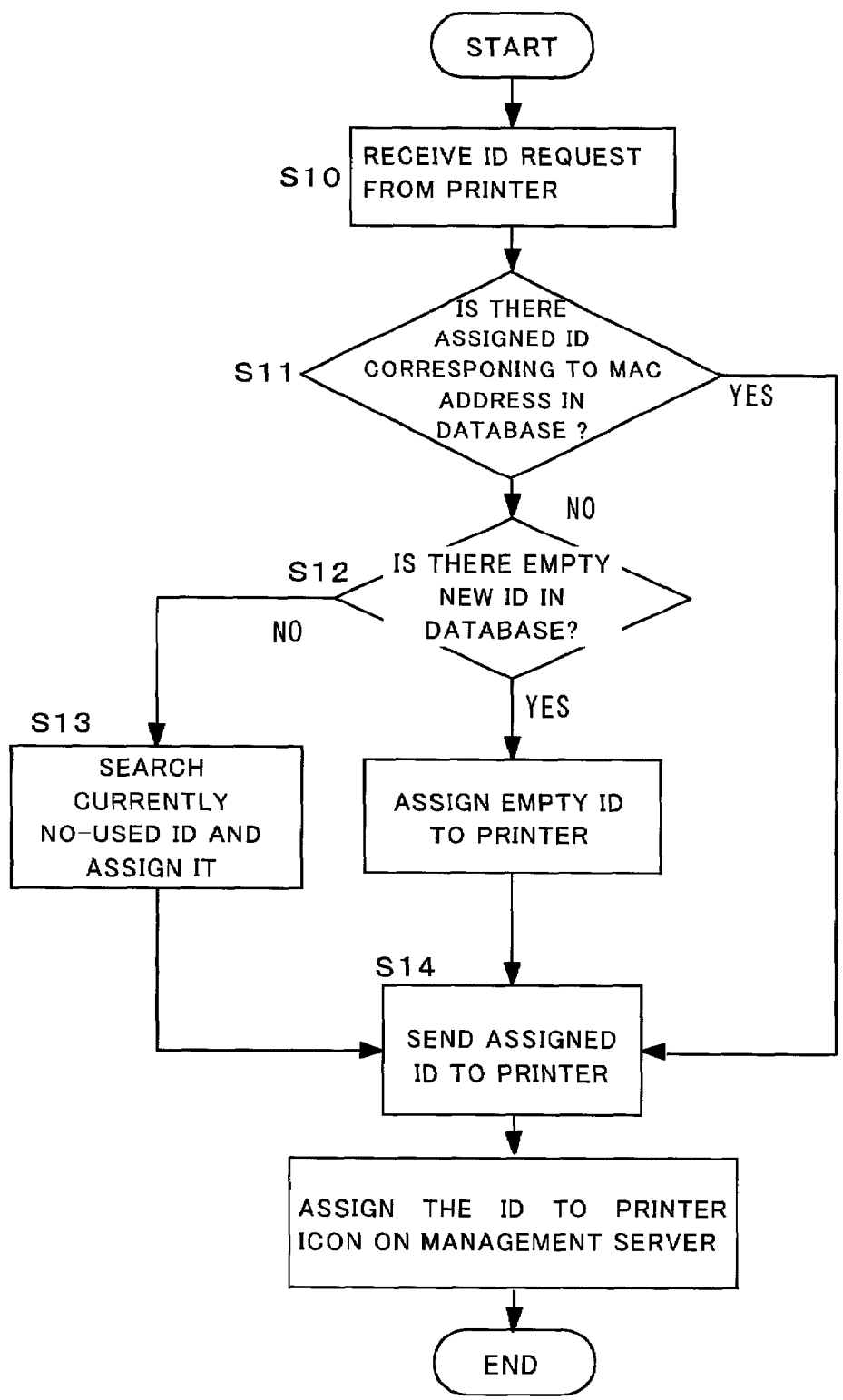
FIG. 7 shows a flowchart illustrating the identifier allocation processing in the network device manager shown in FIG. 2.

First, referring to FIG. 7, an identifier management processing performed in server 1 (network device manager 4) is explained.

(Step S10) Identifier request signal is received from printer 6-1. As described later referring to FIG. 8, printer 6-1 broadcasts a request signal onto network 20 when an identifier is required, such as at the time of initial condition.

(S11) Network device manager 4 in printer server 1 receives the request signal and looks up in network device management table 50 in file memory 5 using MAC address contained in the request signal to determine whether the assigned identifier exists. When there exists the assigned identifier in table 50, the process proceeds to step S14.

(S12) Otherwise, when the MAC address is not found in network device management table 50 of file memory 5, or the identifier is not found in table 50, an idle identifier is looked for from identifier management table 51 in file memory 5. When an idle identifier is found, this identifier is assigned to the printer concerned, to register to network device management table 50.

(S13) On the other hand, when an idle identifier is not found, a an identifier which is recently unused is selected from identifier management table 51 in file memory 5. (The used identifier is stored back to the bottom of the list.) Thus, even when an addition and deletion of devices are repeatedly carried out, the repeated allocation of the identical identifier is avoided.

(S14) Then, the assigned identifier is forwarded to the agent of the printer (network device). UI portion 2 indicates the operation condition of each network device on the screen. The identifier is assigned for the icon of the printer in concern.

Figure 8:
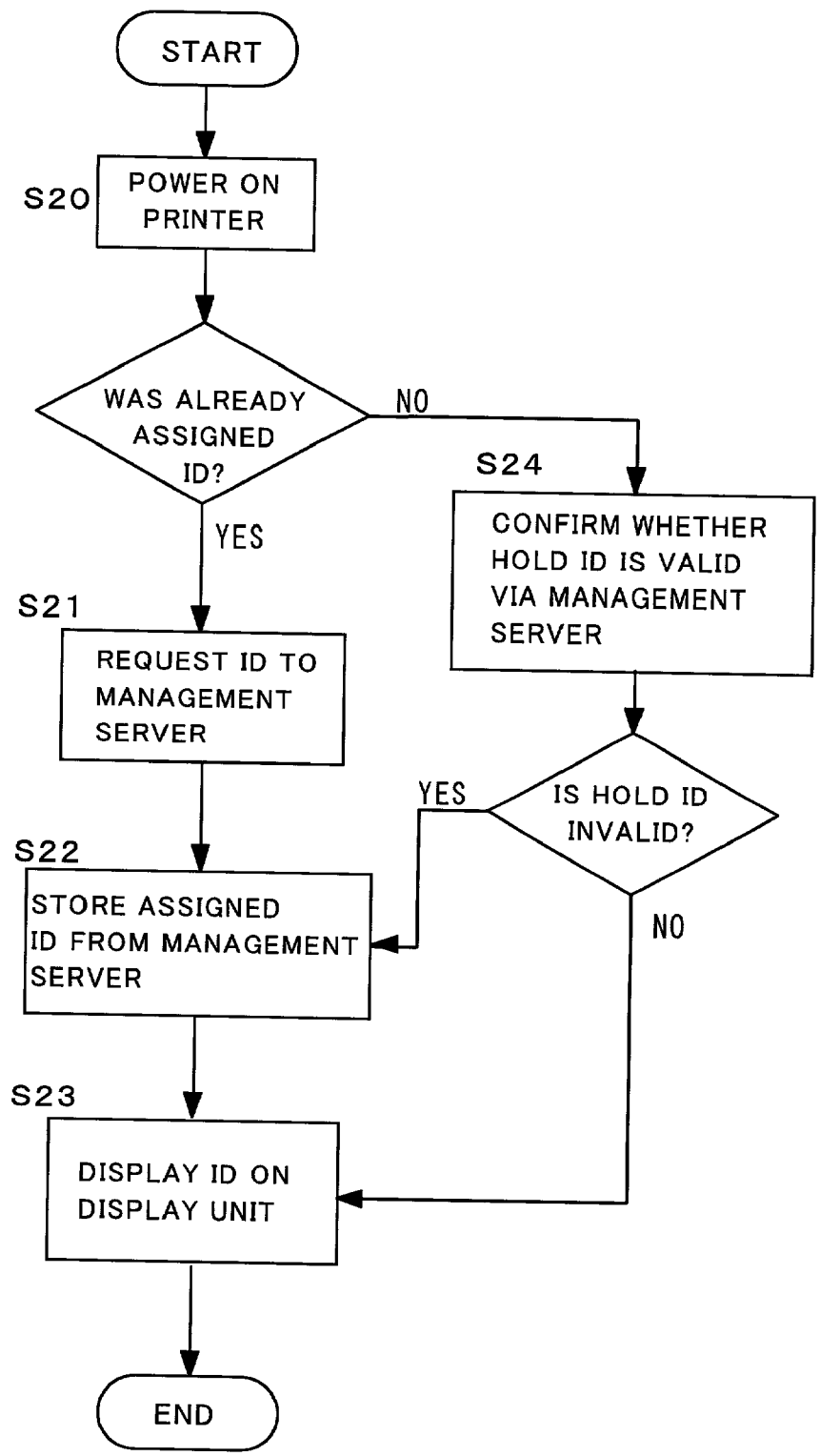
FIG. 8 shows a flowchart of the identifier processing carried out in the network device.

Now, referring to FIG. 8, an identifier management processing for a network device is described hereafter.

(S20) When the power of a printer is turned on, agent 10 determines whether an identifier has been assigned to the printer concerned, by referring to a memory 12.

(S21) If an identifier is not assigned yet, agent 10 requests management server 1 to obtain an identifier.

(S22) As mentioned before, management server 1 assigns the identifier to transmit to the printer. Agent 10 receives the identifier to store to a memory 12 provided in the device.

(S23) Identifier output unit 11 calls the identifier data stored in memory 12 to indicate the identification information constantly (in this case, color and device name).

(S24) On the other hand, if an identifier is already assigned, agent 10 inquires management server 1 whether the identifier already assigned and retained is still effective. In case the retaining period expires, management server 1 newly assigns an identifier in above-mentioned manner, then the step proceeds to S22. If the retaining period does not expire yet, management server 1 informs the identifier to the printer. The printer receives the identifier and the step proceeds to S23.

Figure 10:
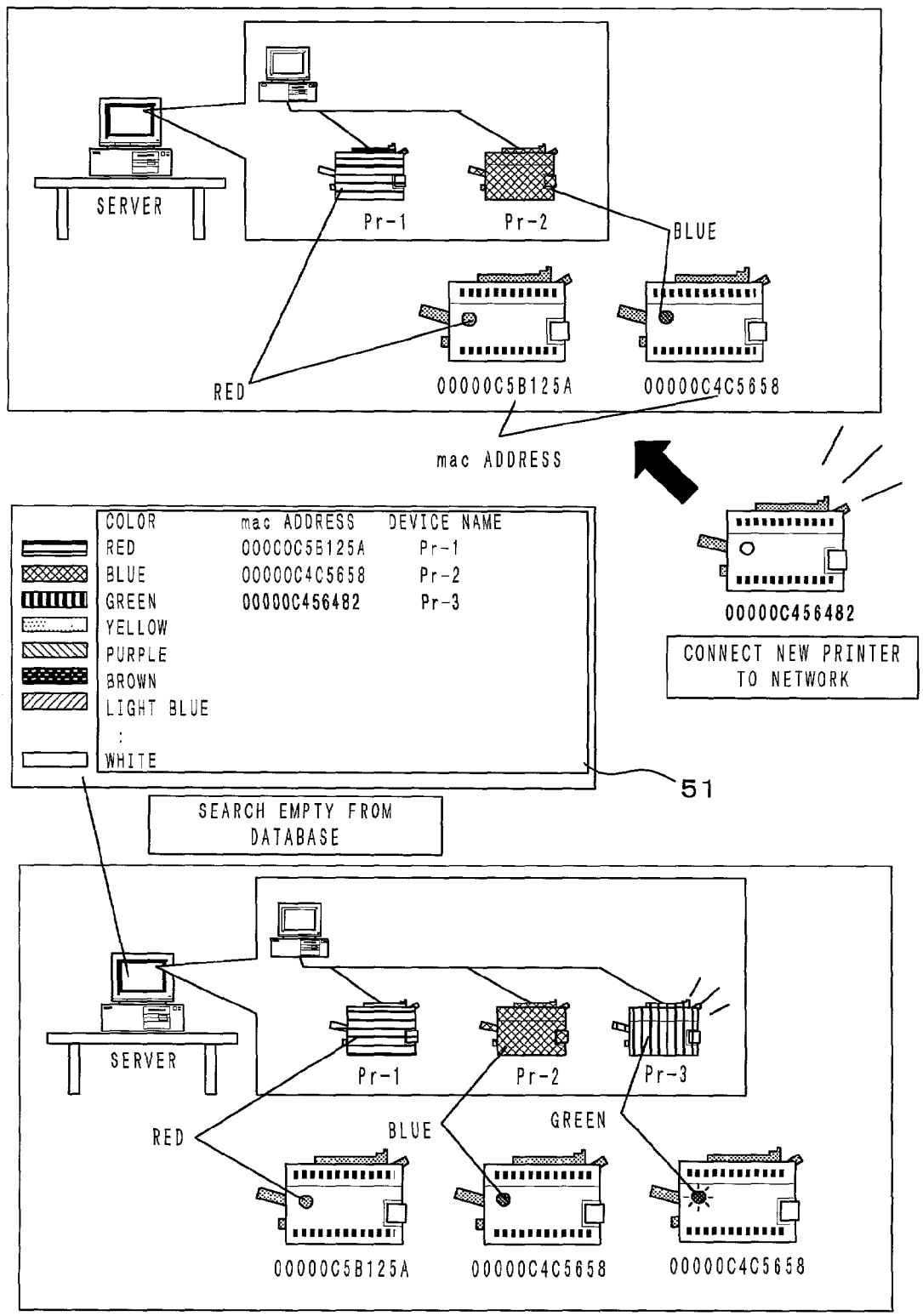
FIG. 10 shows an explanatory diagram of the management processing for network devices.

In FIG. 10, there is shown an explanatory diagram of the operation at the time of newly adding a printer to the network. When the new printer is installed and connected to the network, identifier management table (database) 51 is looked up to find an idle identifier for new registration. In UI portion 2, the operation conditions etc. of each network device are displayed onto the screen. The displayed contents include data linked with the indication of identifier output unit 11 located at each printer. Accordingly, it is easy to specify the network device displayed on the screen by the management software corresponds to which device actually exists.

Figure 9:
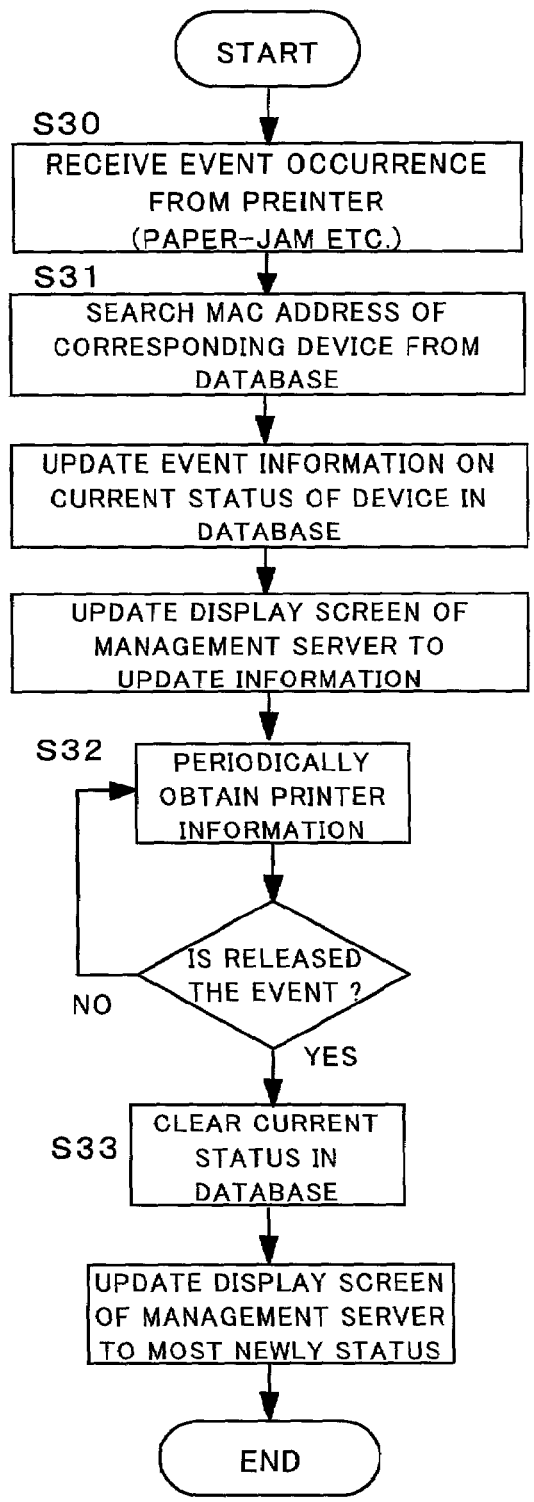
FIG. 9 shows a flowchart of network device management processing carried out in the network device manager.

Now, referring to FIG. 9, an event management processing in network device manager 4 is explained hereafter.

(S30) On occurrence of an event (in case of printer, event such as 'paper jam', 'toner empty' or 'paper empty', etc.) each printer 6-1 to 6-N informs the occurrence of the event to server 1.

(S31) Then server 1 looks up into network device management table (database) 50 to search the MAC address of the device concerned, to overwrite the event information to the current status of the device in the database. Then, management server 1 updates the display screen to the up-to-date information.

(S32) Server 1 periodically obtains the printer information to determine whether the event cause is removed.

(S33) When the event cause is found removed, the current status of the device stored in the database is cleared. The screen display is renewed to the up-to-date information.

Accordingly, management server 1 detects the status of network devices such as printers to display onto the screen. In this indication, the icon of the indication identifier, which is the same as the icon of the identifier indicated on the network device, is used for display.

[Other Embodiment]

Figure 11:
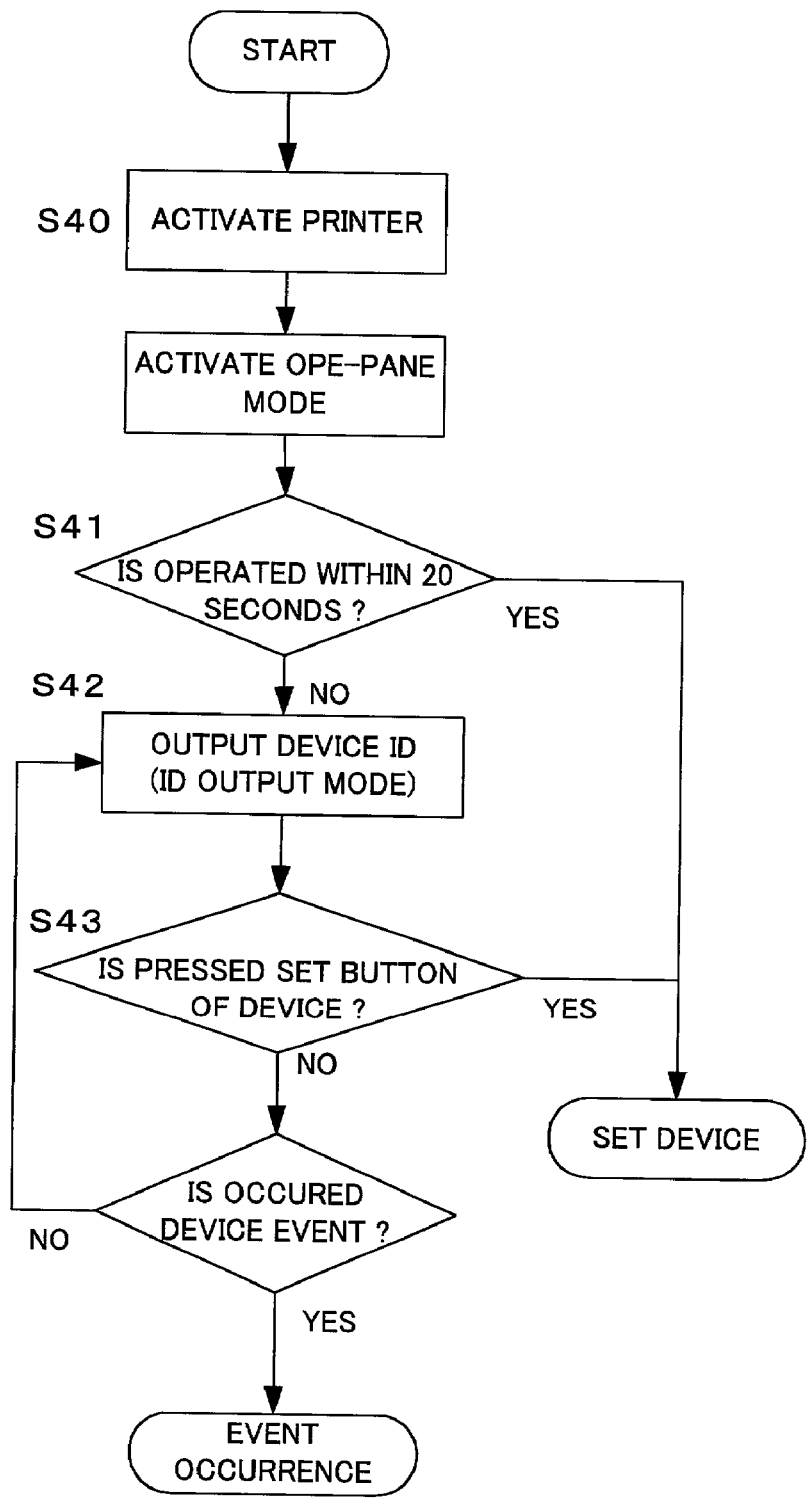
FIG. 11 shows a flowchart according to another embodiment of the present invention, illustrating the identifier output processing carried out in the network device.
Figure 12:
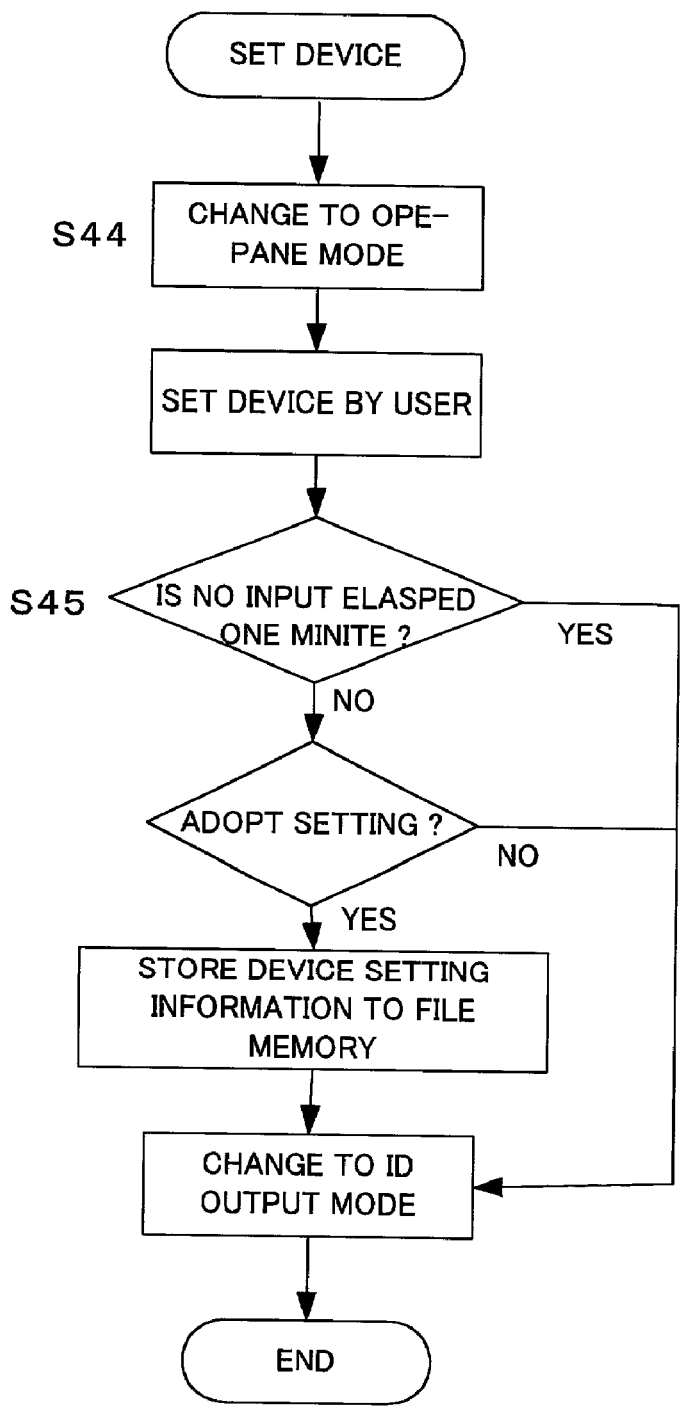
FIG. 12 shows a flowchart of device setting processing shown in FIG. 11.
Figure 13:
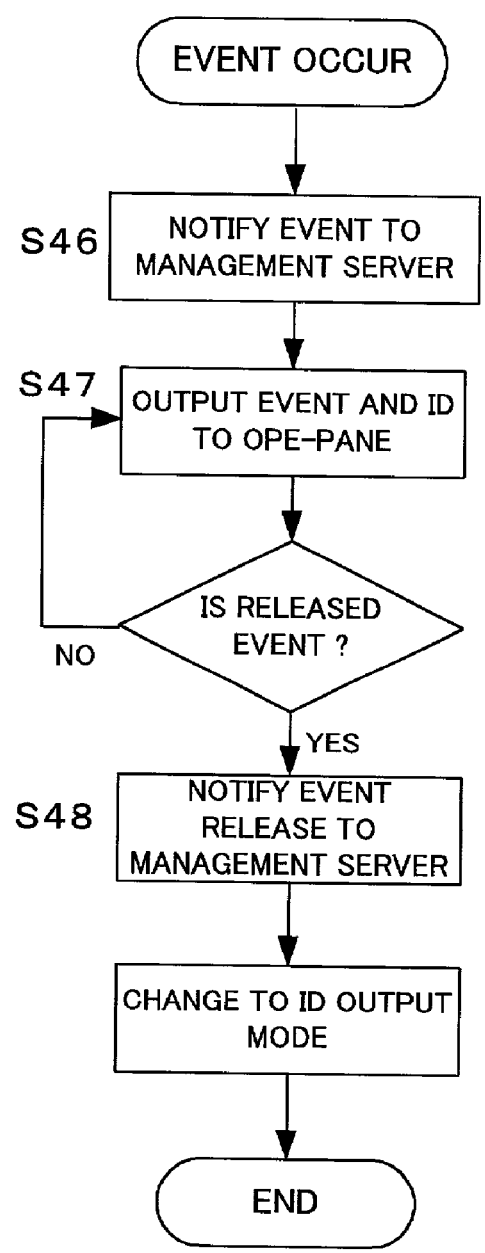
FIG. 13 shows a flowchart of event processing shown in FIG. 11.

In FIG. 11 to FIG. 13, there are shown flowcharts of indication processing for printers in accordance with another embodiment of the present invention. FIG. 14 is an explanatory diagram. In this embodiment, an operation unit normally used as an operation panel for setting various data is also used for identifier output unit at the time of standing by for operation or when an event such as a trouble occurs.

Figure 14A:
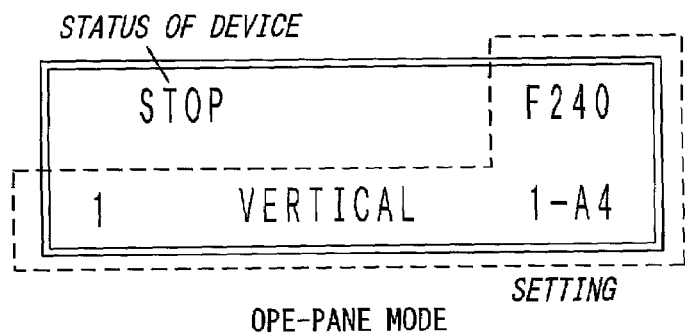
FIG. 14(A), 14(B) and 14(C) show explanatory diagrams illustrating an example of identifier indication on an operation panel according to another embodiment of the present invention.

(S40) In FIG. 11, the unit acts as an operation panel at the start-up. An example of indication in this 'operation panel mode' is shown in FIG. 14(A). In this operation panel mode, the device status and the device setting condition are displayed.

(S41) It is determined whether any operation is carried out within a predetermined time (that is, an estimated period for determining the operator has no intention to input after start-up: an adequate supervisory period is about 20 seconds, but adjustable by the operator.)

Figure 14B:
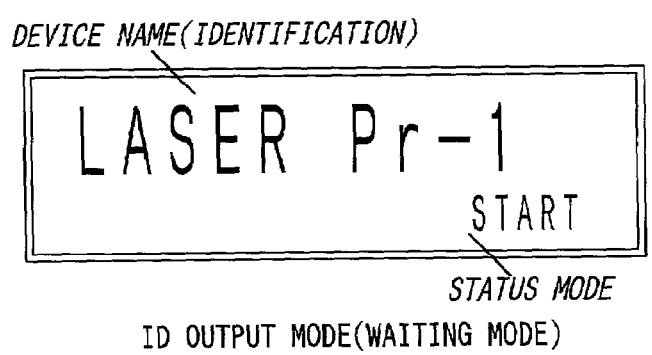

(S42) If non-operation state continues throughout this period, the mode of the operation unit is changed to an 'identifier indication' mode, to indicate the identifier (device name, color, etc.) as shown in FIG. 14(B).

(S43) When the operator intends to set the printer using the operation panel, the necessary operation is performed using an operation portion 13 (for example, by depressing a setup button). Then the process proceeds to the device setting process shown in FIG. 12. When no operation is performed, whether or not any event occurs in the device is investigated. If an event has arisen, the process proceeds to the event occurrence process shown in FIG. 13. Otherwise, if no event has occurred, the process returns to step S42.

(S44) In the device setting process, the mode is changed into the operation panel mode as shown in FIG. 14(A) to enable to input the device setting data by the operator.

(S45) When the input by the operator is suspended for a certain period (an adequate supervisory period is about one minute, but adjustable by the operator), or when the device setting is not applicable, the mode is changed into the identifier output mode. When the device setting is acceptable, the setting information is stored into the memory, then the mode is also changed to the identifier output mode.

(S46) When the event occurred on the device shown in FIG. 13, the event is informed to management server 1.

Figure 14C:
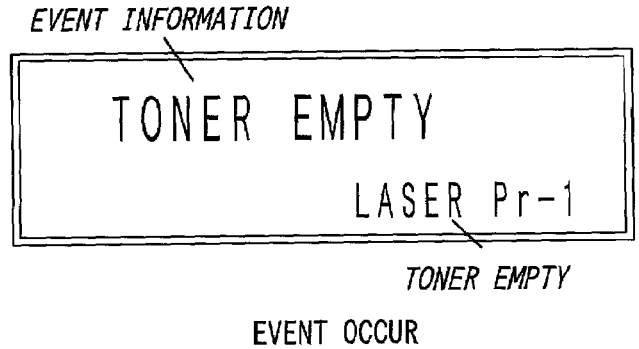

(S47) Then, at the same time that the event occurred, the event and, as auxiliary information thereof, an identifier are output on the operation panel, as shown in FIG. 14(C). For example, 'Toner Empty, Pr-1' is indicated. The operator, when necessary, read the output device name, etc. aloud to communicate to the administrator with the event information. Preferably, the event is notified with the increased brightness, power, etc. to emphasize the identifier.

(S48) When the event condition is removed, event removal is informed to management server 1, and the mode of operation panel is changed to identifier output mode (FIG. 14(B)).

Thus the operation panel can be used for indicating the identifier.

Here, when the identifier indicator shown in FIG. 1 and FIG. 5 is separately provided, it is also possible to adopt a method that the identifier is not constantly indicated on the device. In this case, a function for indicating the identifier at a necessary timing is provided. More specifically, for example, the identifier is constantly indicated on the management server (software). If it becomes necessary to see the condition of the problem occurred on the device using the management software, the identifier is displayed manually by operating the operation portion 13 of the device. Namely, operation portion 13 forwards an identifier request signal to agent 10, and agent 10 forwards the request signal to identifier output unit 11 to output the identifier.

When the device indicated by the management software is to be distinguished, the device is selected in UI portion 2 of management server 1 to request the indication of the identifier. The request signal is transferred to identifier output unit 11 of the selected device through the path identical to the path for assigning signal, to indicate the identifier.

According to the present invention, the following effects are obtained:

(1) In the management equipment, identification information is automatically assigned and managed for respective network devices. Then the identification information assigned by the administrator is visually output at the location of each network device. On the management screen of the management equipment, the identifier which is the same as the above-mentioned identification information is indicated also. Thus the same identifier is indicated at the network device location as the identifier indicated on the management screen. This enables the operator to recognize easily at the installation location the network device having been indicated on the management screen.

For example, when it is required to look for the device a state of which is detected by the management software, the actual device can easily be specified if only the operator looks at the identifier (device name and color automatically assigned) being constantly displayed on the device. Because the assigned color and device name are being displayed constantly on the device, it is quite easy for the operator to look for the device in concern, as well as to remember the installation location without need of repeating the operation. Further, when a problem arises on the device, the device can be retrieved by the management software using the identifier (device name and color automatically assigned) displayed on the device.

(2) The identification information different from that named either before factory shipment or during network operation is assigned in management equipment. Therefore the identification information easy for the operator's recognition can be assigned. Moreover, because automatic allocation of the identification information to network devices is carried out by the management equipment, the identifier which is the same as that indicated on the management screen can be displayed at the network device.

(3) Because the definitive name can be assigned automatically when installing the device, works by the administrator can be reduced.

The foregoing description of the embodiments are not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A method for managing a plurality of network devices comprising:
    setting identification information to each network device by management equipment;
    outputting said identification information visually on said network device;
    indicating the network device with an identifier which is the same as said identification information onto a screen of said management equipment; and
    displaying said identification information on said network device, if no operation is performed for a predetermined time period when the network device displays a device setting, wherein a user is enabled to assign identification information different from the identification information used in the network.

2. The method for managing a plurality of network devices according to claim 1, wherein said setting step comprises the steps of:
    retrieving a database having said identification information related to each network device; and
    assigning said identification information automatically to said network device.

3. The method for managing a plurality of network devices according to claim 1, wherein said outputting step comprises the step of:
    displaying said identification information onto an operation panel of said network device.

4. The method for managing a plurality of network devices according to claim 3, wherein said identifier comprises a primary identifier and a secondary identifier respectively includes a color and letter.

5. A network management system having a plurality of network devices connected to management equipment through a network, said network management system comprises:

said management equipment for setting identification information to each network device; and said plurality of network devices for visually outputting said identification information assigned thereto, wherein said management equipment indicates said network device onto a screen using an identifier which is the same as said identification information, wherein said identification information is displayed on said network device, if no operation is performed for a predetermined time period when the network device displays a device setting, and wherein a user is enabled to assign identification information different from the identification information used in the network.

6. The network device management system according to claim 5, wherein said management equipment retrieves a database having identification information related to each network device for automatically assigning a retrieved identification information to each network device.

7. The network device management system according to claim 5, wherein said network device management system displays said identification information onto an operation panel of said network device.

8. The network device management system according to claim 5, wherein said network device is a printer and said management equipment is a server.

9. A network device, comprising:

a reception unit for receiving identifier information for indicating an identifier identical with an identifier assigned by management equipment and indicated on the management equipment;

a display unit for visually indicating the received identifier information and for setting the network device wherein said identifier information is displayed on said network device, if no operation is performed for a predetermined time period when the network device displays a device setting, and, wherein a user is enabled to assign identification information different from the identification information used in the network.

* * * * *